(12) United States Patent
Jones et al.

(10) Patent No.: US 10,189,221 B2
(45) Date of Patent: Jan. 29, 2019

(54) TRANSFER RING SHOE AND TRANSFER RING HAVING VARIED SHOE PROFILE

(71) Applicant: Davian Enterprises, LLC, Greenback, TN (US)

(72) Inventors: Patrick Jones, Sarasota, FL (US); Ian Smith, Maryville, TN (US); William Jones, West Midlands (GB); Robert L. Marcus, Jr., Knoxville, TN (US)

(73) Assignee: Davian Enterprises, LLC, Greenback, TN (US)

( * ) Notice: Subject to any disclaimer, the term of this patent is extended or adjusted under 35 U.S.C. 154(b) by 240 days.

(21) Appl. No.: 14/880,641

(22) Filed: Oct. 12, 2015

(65) Prior Publication Data

US 2016/0031173 A1 Feb. 4, 2016

Related U.S. Application Data

(63) Continuation-in-part of application No. 13/964,387, filed on Aug. 12, 2013, now abandoned.

(60) Provisional application No. 61/681,917, filed on Aug. 10, 2012.

(51) Int. Cl.
*B29D 30/26* (2006.01)
*B25J 15/00* (2006.01)

(52) U.S. Cl.
CPC ...... *B29D 30/2607* (2013.01); *B25J 15/0028* (2013.01)

(58) Field of Classification Search
CPC ............ B29D 30/1614; B29D 30/2607; B29D 30/3014; B29D 2030/0038; B29D 2030/2657; B29D 30/26
See application file for complete search history.

(56) References Cited

U.S. PATENT DOCUMENTS

| 1,233,567 | A | 7/1917 | Furry |
| 1,750,728 | A | 3/1930 | Robison |

(Continued)

FOREIGN PATENT DOCUMENTS

| CA | 2188639 | 10/1996 |
| CA | 2219387 | 10/1997 |

(Continued)

OTHER PUBLICATIONS

Machine generated English language translation of JP 2008-221750 (original document dated Sep. 2008).*

(Continued)

*Primary Examiner* — Martin K Rogers
(74) *Attorney, Agent, or Firm* — Pitts & Lake, P.C.

(57) ABSTRACT

A transfer ring of the type having a plurality of shoes arranged in a substantially circular configuration to define an inwardly-facing segmented cylindrical gripping surface, and a shoe for use in such a transfer ring, are disclosed. Each shoe comprises an arcuate interior surface defining a segment of the cylindrical gripping surface. The interior surface of each shoe has a first arcuate edge and an opposite second arcuate edge arranged substantially parallel to one another, and opposite first and second end edges extending between respective ends of said first and second arcuate edges. Each first end edge of each arcuate surface is mounted adjacent the second end edge of an adjacent arcuate surface, and the first end edge of at least one of the arcuate surfaces defines a varied or irregular shape along its arcuate surface.

2 Claims, 13 Drawing Sheets

(56) References Cited

U.S. PATENT DOCUMENTS

| | | |
|---|---|---|
| 2,168,897 A | 8/1939 | Bostwick |
| 2,201,469 A | 5/1940 | Bostwick |
| RE22,369 E | 8/1943 | Bostwick |
| 2,335,169 A | 11/1943 | Bostwick |
| 2,353,767 A | 7/1944 | Schnedarek |
| 2,367,831 A | 1/1945 | Manson |
| 2,529,861 A | 11/1950 | Angell et al. |
| 2,614,057 A | 10/1952 | Ericson et al. |
| 2,699,198 A | 1/1955 | Balzhiser |
| 2,715,932 A | 8/1955 | Frazier |
| 2,728,616 A | 12/1955 | Potter |
| 3,077,918 A | 2/1963 | Noall |
| 3,101,289 A | 8/1963 | Giletta et al. |
| 3,111,444 A | 11/1963 | Pouilloux |
| 3,111,445 A | 11/1963 | Pouilloux et al. |
| 3,140,216 A | 7/1964 | Shilts et al. |
| 3,207,648 A | 9/1965 | Shilts |
| 3,346,434 A | 10/1967 | Fulton |
| 3,366,526 A | 1/1968 | Winslow |
| 3,375,154 A | 3/1968 | Ruttenberg et al. |
| 3,405,023 A | 10/1968 | Eckenwiler et al. |
| 3,408,244 A | 10/1968 | Frazier |
| 3,485,700 A | 12/1969 | Cooper et al. |
| 3,489,634 A | 1/1970 | Pizzo et al. |
| 3,507,528 A | 4/1970 | Desmarchais |
| 3,547,733 A | 12/1970 | Leblond |
| 3,598,673 A | 8/1971 | Caretta |
| 3,644,162 A | 2/1972 | Appleby et al. |
| 3,676,261 A | 7/1972 | Appleby et al. |
| 3,694,290 A | 9/1972 | Pacciarini et al. |
| 3,695,974 A | 10/1972 | Henley |
| 3,784,426 A | 1/1974 | Woodhall et al. |
| 3,787,262 A | 1/1974 | Appleby et al. |
| 3,816,218 A | 6/1974 | Felten |
| 3,833,444 A | 9/1974 | Mallory |
| 3,837,968 A | 9/1974 | Marra |
| 3,867,229 A | 2/1975 | Marra |
| 3,873,398 A | 3/1975 | Yokoo et al. |
| 3,887,423 A | 6/1975 | Gazuit |
| 3,929,546 A | 12/1975 | Katagiri et al. |
| 3,948,717 A | 4/1976 | Suzuki et al. |
| 4,010,058 A | 3/1977 | Kubinski et al. |
| 4,105,487 A | 8/1978 | Suzuki et al. |
| 4,126,507 A | 11/1978 | Kim et al. |
| 4,128,450 A | 12/1978 | Cantarutti |
| 4,131,500 A | 12/1978 | Wilde et al. |
| 4,149,927 A | 4/1979 | Lauer, Jr. |
| 4,151,035 A | 4/1979 | Jellison |
| 4,155,796 A | 5/1979 | Rambacher |
| 4,210,482 A | 7/1980 | Collins |
| 4,220,494 A | 9/1980 | Kawaida et al. |
| 4,230,517 A | 10/1980 | Enders |
| 4,239,579 A | 12/1980 | Felten et al. |
| 4,292,112 A | 9/1981 | Kumagai |
| 4,312,696 A | 1/1982 | Bryant |
| 4,324,604 A | 4/1982 | Alexander et al. |
| 4,325,764 A | 4/1982 | Abbleby et al. |
| 4,392,899 A | 7/1983 | Bertoldo |
| 4,425,180 A | 1/1984 | Samokhvalov et al. |
| 4,436,574 A | 3/1984 | Long et al. |
| 4,445,962 A | 5/1984 | Felder |
| 4,469,546 A | 9/1984 | Klose et al. |
| 4,472,233 A | 9/1984 | Fukamachl et al. |
| 4,473,427 A | 9/1984 | Irie |
| 4,510,012 A | 4/1985 | Kawaida et al. |
| 4,519,279 A | 5/1985 | Ruggeri |
| 4,521,269 A | 6/1985 | Ozawa |
| 4,582,557 A | 4/1986 | Enders |
| 4,626,302 A | 12/1986 | Casey et al. |
| 4,636,277 A | 1/1987 | Owen et al. |
| 4,729,541 A | 3/1988 | Maier |
| 4,780,171 A | 10/1988 | Byerley |
| 4,798,647 A | 1/1989 | Haas |
| 4,861,123 A | 8/1989 | Russell |
| 4,861,173 A | 8/1989 | Kemp |
| 5,047,108 A | 9/1991 | Byerley |
| 5,066,354 A | 11/1991 | Benjamin |
| 5,071,498 A | 12/1991 | Nishilde et al. |
| 5,078,819 A | 1/1992 | Sergel et al. |
| 5,089,077 A | 2/1992 | Byerley |
| 5,203,947 A | 4/1993 | Boeker |
| 5,223,074 A | 6/1993 | Miyanaga et al. |
| 5,225,028 A | 7/1993 | Bierens |
| 5,232,542 A | 8/1993 | Norjiri et al. |
| 5,264,068 A | 11/1993 | Masuda |
| 5,320,701 A | 6/1994 | Jellison et al. |
| 5,354,405 A | 10/1994 | Byerley |
| 5,380,384 A | 1/1995 | Tokunaga et al. |
| 5,441,587 A | 8/1995 | Byerley |
| 5,500,074 A * | 3/1996 | Suzuki ............... B29D 30/2607 156/126 |
| 5,505,803 A | 4/1996 | Byerley |
| 5,558,733 A | 9/1996 | Byerley |
| 5,618,374 A | 4/1997 | Byerley |
| 5,635,016 A * | 6/1997 | Byerley ............... B29D 30/242 156/406.2 |
| 5,709,768 A | 1/1998 | Byerley |
| 5,735,995 A | 4/1998 | Bull et al. |
| 5,755,922 A | 5/1998 | Baidoni et al. |
| 6,004,250 A | 12/1999 | Byerley |
| 6,007,268 A | 12/1999 | Whittington et al. |
| 6,013,147 A | 1/2000 | Byerley |
| 6,058,999 A | 5/2000 | Roberts et al. |
| 6,117,269 A | 9/2000 | Pizzomo |
| 6,152,645 A | 11/2000 | Sanford |
| 6,238,292 B1 | 5/2001 | Pelkey |
| 6,336,485 B1 | 1/2002 | Kaneko et al. |
| 6,390,166 B1 | 5/2002 | Roberts et al. |
| 6,457,505 B1 | 10/2002 | Byerley |
| 6,539,998 B2 | 4/2003 | Sergel et al. |
| 6,571,682 B2 | 6/2003 | Roberts et al. |
| 6,585,022 B1 | 7/2003 | Rex |
| 6,602,372 B1 | 8/2003 | Byerley |
| 6,673,183 B2 | 1/2004 | Byerley |
| 6,793,752 B2 | 9/2004 | Lemaire et al. |
| 7,000,905 B1 | 2/2006 | Lutter et al. |
| 7,287,772 B2 | 10/2007 | James |
| 7,288,160 B2 | 10/2007 | Roedseth et al. |
| 7,370,897 B2 | 5/2008 | Fukazawa |
| 7,637,665 B2 | 12/2009 | Cook |
| 7,699,952 B2 | 4/2010 | Linne et al. |
| 7,837,816 B2 | 11/2010 | Lilnne et al. |
| 8,056,597 B2 | 11/2011 | Byerley |
| 8,091,602 B2 | 1/2012 | Roberts et al. |
| 8,272,417 B2 | 9/2012 | Painter |
| 8,555,944 B2 | 10/2013 | Painter |
| 2003/0197389 A1 | 10/2003 | Mollanen et al. |
| 2004/0239134 A1* | 12/2004 | Fukazawa .......... B29D 30/0016 294/119.2 |
| 2008/0202690 A1 | 8/2008 | Painter |
| 2010/0000658 A1* | 1/2010 | Roberts ............... B29D 30/2607 156/110.1 |
| 2010/0101732 A1 | 4/2010 | Howley et al. |
| 2010/0186864 A1 | 7/2010 | Koopman et al. |
| 2011/0303366 A1 | 12/2011 | Byerley |
| 2012/0017720 A1 | 1/2012 | Painter |
| 2012/0033906 A1 | 2/2012 | Painter |
| 2012/0090787 A1 | 4/2012 | Jones et al. |
| 2012/0168087 A1 | 7/2012 | Byerley |
| 2012/0222822 A1 | 9/2012 | Jones et al. |
| 2012/0256434 A1 | 10/2012 | Roberts et al. |
| 2013/0008611 A1 | 1/2013 | Marcus et al. |
| 2014/0213330 A1 | 8/2014 | Jones et al. |
| 2015/0028147 A1 | 1/2015 | Rich |

FOREIGN PATENT DOCUMENTS

| | | |
|---|---|---|
| CA | 2142004 | 4/2006 |
| DE | 19913241 | 9/2000 |
| DE | 102009025759 | 11/2010 |
| EP | 1688240 | 11/2004 |
| EP | 1621327 | 6/2005 |
| GB | 2323573 | * 9/1998 ............. B60C 11/03 |

(56) References Cited

FOREIGN PATENT DOCUMENTS

| | | | | |
|---|---|---|---|---|
| JP | 2008-221750 | | 3/2007 | |
| JP | 2008-221750 | * | 9/2008 | ............ B29D 30/26 |
| JP | 2011-255768 | | 12/2011 | |
| MX | 200554 | | 1/2001 | |
| NL | 9401271 | | 3/1995 | |
| WO | WO2001/007242 | | 2/2001 | |
| WO | WO2006/003058 | | 1/2006 | |
| WO | WO2008/025598 | | 3/2008 | |
| WO | WO2010/052103 | | 5/2010 | |
| WO | WO2011/159343 | | 12/2011 | |
| WO | WO 2012/021160 | * | 2/2012 | ............ B29C 33/20 |
| WO | WO2012/021160 | | 2/2012 | |
| WO | WO2012/031193 | | 3/2012 | |

OTHER PUBLICATIONS

Patent Cooperation Treat, International Search Report, EPO Form 1507S, dated May 18, 2016.

* cited by examiner

TRANSFER RING SHOE AND TRANSFER RING HAVING VARIED SHOE PROFILE

CROSS-REFERENCE TO RELATED APPLICATIONS

This application is a continuation-in-part of U.S. patent application Ser. No. 13/964,387, filed on Aug. 12, 2013, which claims the benefit of U.S. Provisional Application No. 61/681,917, filed on Aug. 10, 2012.

STATEMENT REGARDING FEDERALLY-SPONSORED RESEARCH OR DEVELOPMENT

Not Applicable

BACKGROUND OF THE INVENTION

1. Field of Invention

The present general inventive concept relates to devices that are useful in the manufacture of vehicle tires. More particularly, the present general inventive concept relates to an improved transfer ring useful in the manufacture of vehicle tires.

2. Description of the Related Art

The manufacture of a vehicle tire commonly includes the steps of forming a tire carcass, forming a toroid-shaped belt and tread "package" of the tire separately from the carcass, and thereafter marrying the belt and tread package to the tire carcass to form a "green" tire. The green tire is thereafter treated to form the tread and various other features of a finished tire. Other supplementary steps, such as bonding the belt and tread package to the tire carcass (often referred to as "stitching" the belt and tread package), may be performed during the course of, or following, one or more of the aforementioned steps.

Formation of a belt and tread package of a tire is typically accomplished using a belt and tread drum, of the type disclosed in U.S. Pat. No. 6,013,147. Such a belt and tread drum typically has an outer cylindrical surface, or circumference, about which one or more layers of the tire belt material (comprising, for example, reinforcement cords embedded in a polymeric binder) are laid to define the belt and tread package. The circumference of the belt and tread drum is preferably capable of expanding and contracting to allow, for example, removal of a completed belt and tread package from the drum. A completed belt and tread package is typically essentially nonexpandable radially. However, a completed belt and tread package is typically flexible to the extent that, when unsupported, the toroid-shaped belt and tread package will deform and sag under the influence of gravity. Also, desirably, the adjustable circumference of the belt and tread drum enables a single drum to be used to form belt and tread packages of alternative diameters.

In the manufacture of vehicle tires, a tire carcass is typically fabricated using a tire building drum, of the type described in U.S. Pat. No. 6,457,505. Such a tire building drum typically defines a radially expandable and contractible cylindrical working surface, similar to the above-discussed belt and tread drum, upon which a tire carcass is formed. Subsequent to the formation of the tire carcass on the cylindrical working surface, such tire carcass typically is transferred to an expansion drum, of the type discussed in U.S. Pat. No. 6,602,372. The tire carcass is positioned surrounding the expansion drum, and a portion of the tire carcass is overlaid with the belt and tread package. The tire carcass is then inflated to a toroid shape resembling, though often not identical to, the shape of a finished tire. While the tire carcass is inflated, the belt and tread package is stitched to the tire carcass.

In the above-described process, the steps of transferring a tire carcass from a tire building drum to an expansion drum and transferring a belt and tread package to a tire carcass for stitching are typically both accomplished using one or more transfer rings, of the type described in U.S. Pat. No. 8,091,602. Such a transfer ring typically includes a plurality of "shoe" segments having arced interior surfaces which collectively form a segmented, radially-inwardly-facing cylindrical surface suitable for grasping and holding a tire carcass and/or a belt and tread package. Each shoe segment is mounted on an appropriate linkage such that the shoes are collectively radially expandable and contractible with respect to one another, such that the diameter of the segmented, radially-inwardly-facing cylindrical surface can be expanded to fit over a tire carcass and/or belt and tread package, contracted to grasp the tire carcass or belt and tread package for transfer, and then re-expanded to release the tire carcass or belt and tread package following transfer.

When a transfer ring is used as described above to transfer a tire carcass and/or belt and tread package (hereinafter, collectively, "tire component,"), it is not uncommon for the transfer ring to be configured such that the shoes apply considerable pressure to exterior surfaces of the tire component, in part to assist in maintaining a uniform toroid shape of the tire component during transfer. Such high pressures applied to the exterior surfaces of the tire component can result in at least a portion of the arced interior surfaces of the shoes becoming imprinted in the tire component, resulting in the formation of imprints of the interior surfaces of the shoes, and corresponding bulges adjacent the imprints, in the tire component. When a finished tire that includes these imprints and corresponding bulges rolls across a surface, sequential contact of the alternating imprints and bulges in the tire components with the surface can, in certain circumstances, result in undesirable performance features of the finished tire, such as for example vibration and/or resonance of the rolling tire. Such vibration and/or resonance can result in undesirable noise and/or shaking of the tire, increased wear and shortened life of the tire, and in some extreme instances, catastrophic failure of the tire.

In several designs of transfer rings, the above-discussed problem of resonance of a finished tire due to sequential contact between a surface on which the tire is rolled and bulges and imprints of shoe interior surfaces on the tire components is partially addressed by providing a prime number of shoes to form the radially-inwardly-facing cylindrical surface of the transfer ring. For example, in certain transfer ring designs, eleven shoes are provided to define the radially-inwardly-facing cylindrical surface of the transfer ring. In other designs, thirteen shoes are provided to define the radially-inwardly-facing cylindrical surface of the transfer ring. By providing a prime number of shoes to form the radially-inwardly-facing cylindrical surface, the same prime number of resultant imprints and corresponding bulges are formed in the transferred tire components. Thus, the ability for the tire to establish a resonating frequency when rolling across a surface due to sequential contact of the alternating imprints and bulges against the surface is limited to certain frequencies which are compatible with the prime number of shoes of the transfer ring. In many tire designs, the limited accessibility of such compatible frequencies at typical operating speeds of the tire result in low amounts of vibration.

However, in several designs, vibration at such frequencies which is sufficient to disrupt performance of the tire is attainable at certain high speeds of the tire. The high speeds necessary to establish such vibrations are typically outside of the range of speeds for which the particular tire is recommended for use.

Notwithstanding the above, in certain high-speed tire applications, such as for example certain applications of tires used in the landing gear for aircraft, it is possible for tires which were formed using transfer rings having a prime number of shoes to be rolled at speeds which allow for the development of sufficient resonation of the tire which is strong enough to negatively impact performance of the tire and/or to reduce the overall effective life of the tire. Accordingly, a tire transfer ring which includes alternate or additional features for limiting resonance of a tire manufactured using the transfer ring is desired.

BRIEF SUMMARY OF THE INVENTION

According to certain features of the present general inventive concept, a shoe for a transfer ring of the type having a plurality of shoes arranged in a substantially circular configuration to define an inwardly-facing segmented cylindrical gripping surface is provided. Various example embodiments of the present general inventive concept may be accomplished by providing a shoe may comprising an arcuate interior surface defining a segment of the cylindrical gripping surface. The interior surface may have an arcuate first side edge and an opposite arcuate second side edge arranged substantially parallel to one another and opposite first and second end edges extending between respective ends of the first and second side edges. At least a portion of each first and second end edge may extend non-parallel to an axial dimension of the cylindrical gripping surface. The shoe may further comprise at least one connector member extending opposite the arcuate interior surface, with the connector member defining at least one connector portion for connecting the shoe to a transfer ring.

According to certain features of the present general inventive concept, each first and second end edge may define a non-linear shape. In certain embodiments, each first end edge may be keyed to mate with the second end edge, such that the shoe may mate along a first end edge of the shoe with a second end edge of an adjacent shoe. In certain embodiments, each of the first and second end edges may define a plurality of alternating protrusions and recesses extending generally along a circumferential dimension of said cylindrical gripping surface. For example, in one embodiment, each of the first and second end edges may have a first end portion extending substantially perpendicular to the first side edge and an opposite second end portion extending substantially perpendicular to the second side edge. Each of the first and second end edges may have a central portion extending between the first and second end portions at an angle oblique to the axial dimension of the cylindrical gripping surface. In one embodiment, the first end edge may define a first protrusion at an intersection of the first end edge with the first side edge and a first recess at an intersection of the first end edge with the second side edge. The second end edge may define a second protrusion at an intersection of the second end edge with the second side edge and a second recess at an intersection of the second end edge with the first side edge.

Various additional embodiments according to the present general inventive concept may be achieved by providing a transfer ring for use in a system for the manufacture of vehicle tires. In certain embodiments, the transfer ring may comprise a radially expandable and collapsible segmented cylindrical gripping surface defined by a plurality of inwardly-facing arcuate surfaces. Each arcuate surface may be mounted for radial movement toward and away from a central axis of the cylindrical gripping surface between a contracted position and an expanded position. In certain embodiments, the transfer ring may comprise a circular frame, as well as a plurality of elongated driven links, each driven link having a first end rotatably mounted along the circular frame such that each driven link is rotatable between a contracted position and an expanded position. The transfer ring may also include a drive member disposed along the circular frame, the drive member being in operable engagement with the driven links and configured to drive the driven links between the contracted position and the expanded position. In these embodiments, each arcuate surface may be rotatably mounted to one of the driven links at a second end thereof.

In some embodiments, each arcuate surface may define a segment of the cylindrical gripping surface. Each arcuate surface may have an arcuate first side edge and an opposite arcuate second side edge arranged substantially parallel to one another, and opposite first and second end edges extending between respective ends of the first and second side edges. Each first and second end edge may have at least a portion thereof extending non-parallel to the central axis of the cylindrical gripping surface. In some embodiments, each first end edge of one of the plurality of shoes may be mounted adjacent a second end edge of an adjacent arcuate surface. As discussed above, in certain embodiments, each of the first and second end edges may define a plurality of alternating protrusions and recesses extending generally along a circumferential dimension of said cylindrical gripping surface. In certain embodiments, each first protrusion of each arcuate surface may extend sufficiently along a circumferential dimension of the cylindrical gripping surface as to overlap said second protrusion of the adjacent shoe along a zone parallel to the central axis of the cylindrical gripping surface. In certain embodiments, each first end edge of each arcuate surface may define a shape which differs from the first end edges of the remaining shoes, with each second end edge of each arcuate surface being shaped to mate with a first end edge of an adjacent shoe.

BRIEF DESCRIPTION OF THE SEVERAL VIEWS OF THE DRAWINGS

The above-mentioned features of the invention will become more clearly understood from the following detailed description of the invention read together with the drawings in which.

DESCRIPTION OF THE INVENTION

Figure 1:
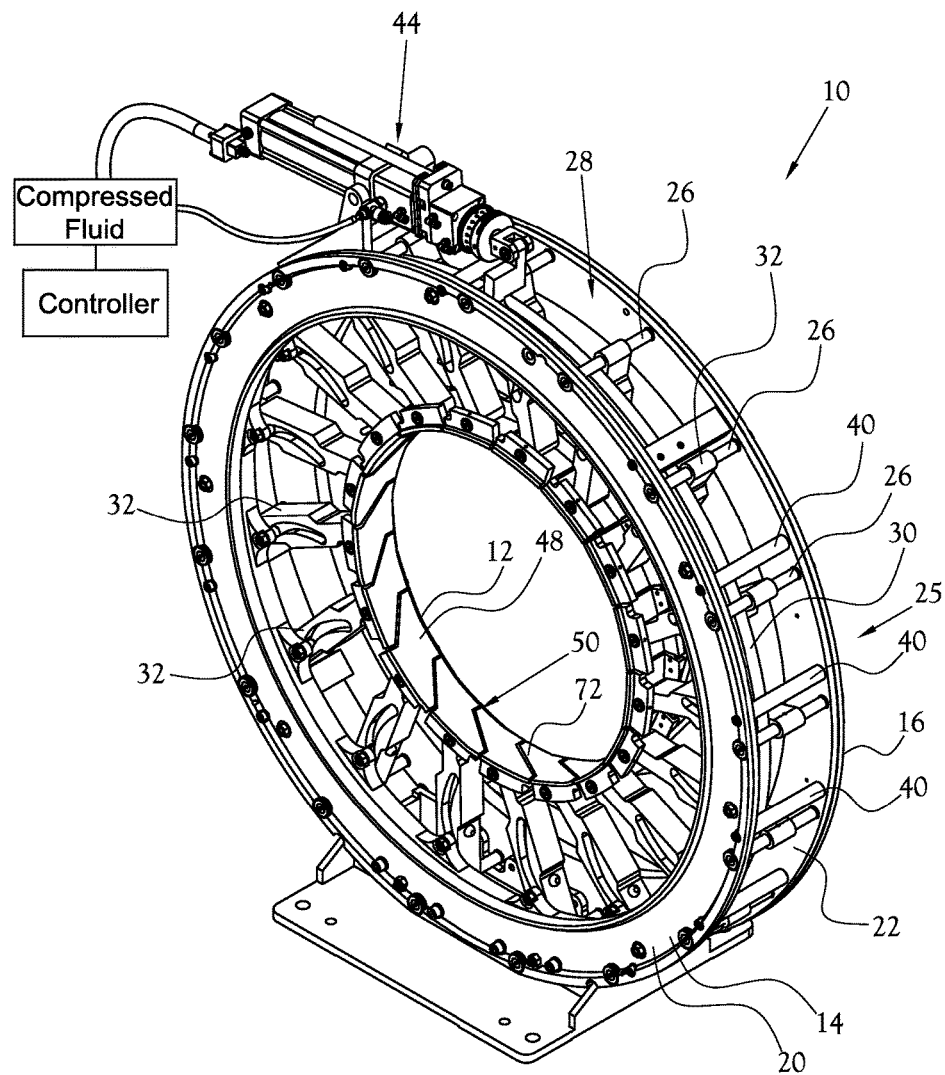
FIG. 1 is a perspective view of one embodiment of a transfer ring constructed in accordance with several features of the present general inventive concept, showing the transfer ring in a contracted position.
Figure 2:
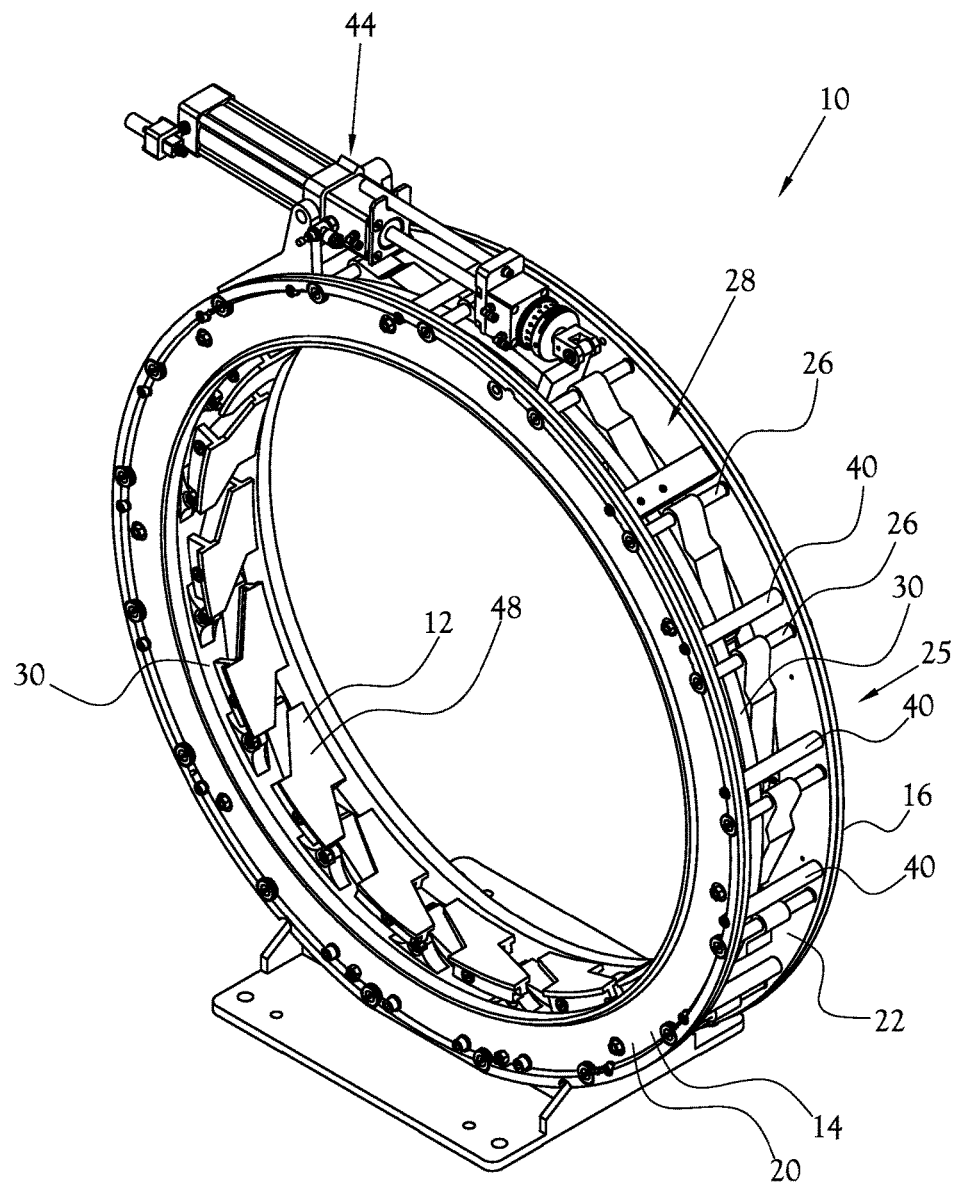
FIG. 2 is a perspective view of the transfer ring of FIG. 1, showing the transfer ring in an expanded position.

According to several features of the present general inventive concept, a shoe for use in a transfer ring and a transfer ring having a varied shoe profile are disclosed. The transfer ring having a varied shoe profile, or transfer ring, is identified at 10 herein and in the accompanying figures. As will be further described hereinbelow, the transfer ring 10 includes a plurality of shoes 12, which in various example embodiment of the present general inventive concept are provided such that each of which defines a profile along an end edge thereof which varies from at least one profile of at least one other shoe, such that the shoes 12 cooperate to produce a less uniform pattern of alternating imprints and bulges in a tire component during use of the transfer ring 10 to transfer the tire component.

With initial reference to FIGS. 1-5, in one embodiment, a transfer ring 10 includes first and second circular frame members 14, 16, respectively, disposed in a fixed, registered, side-by-side, parallel, and spaced apart relationship to one another. The first and second circular frame members 14, 16 are of substantially the same inner and outer diameters, and each is preferably of a generally rectangular cross-section having respective inner and outer opposite flat side surfaces 18, 20 and 22, 24, respectively. A plurality of hinge pin connectors 26 extend between the first and second circular frame members 14, 16 at spaced apart locations about the respective perimetral margins of the first and second circular frame members 14, 16 to rigidly retain the side-by-side, parallel, registered, and spaced apart relationship of the first and second circular frame members 14, 16, thereby defining a skeletal cage 25 having an open space 28 between the first and second circular frame members 14, 16.

Figure 3:
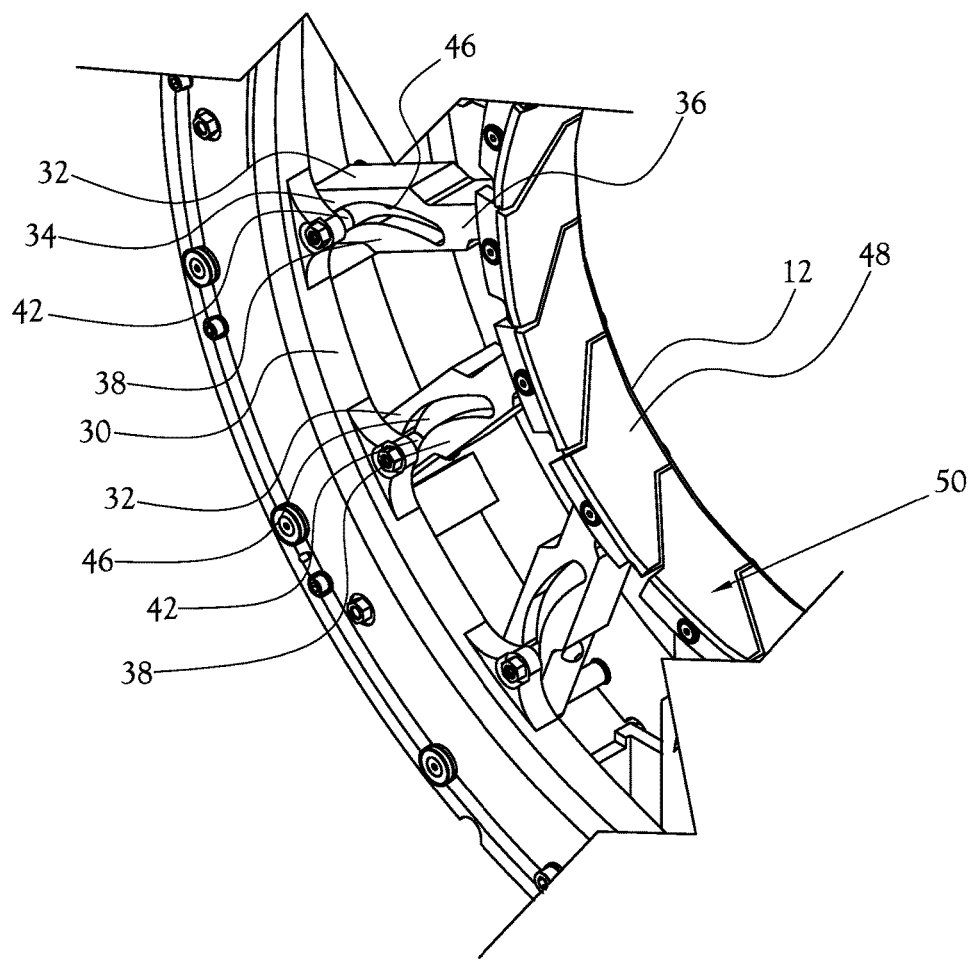
FIG. 3 is a partial perspective view showing a portion of the transfer ring of FIG. 1.
Figure 4:
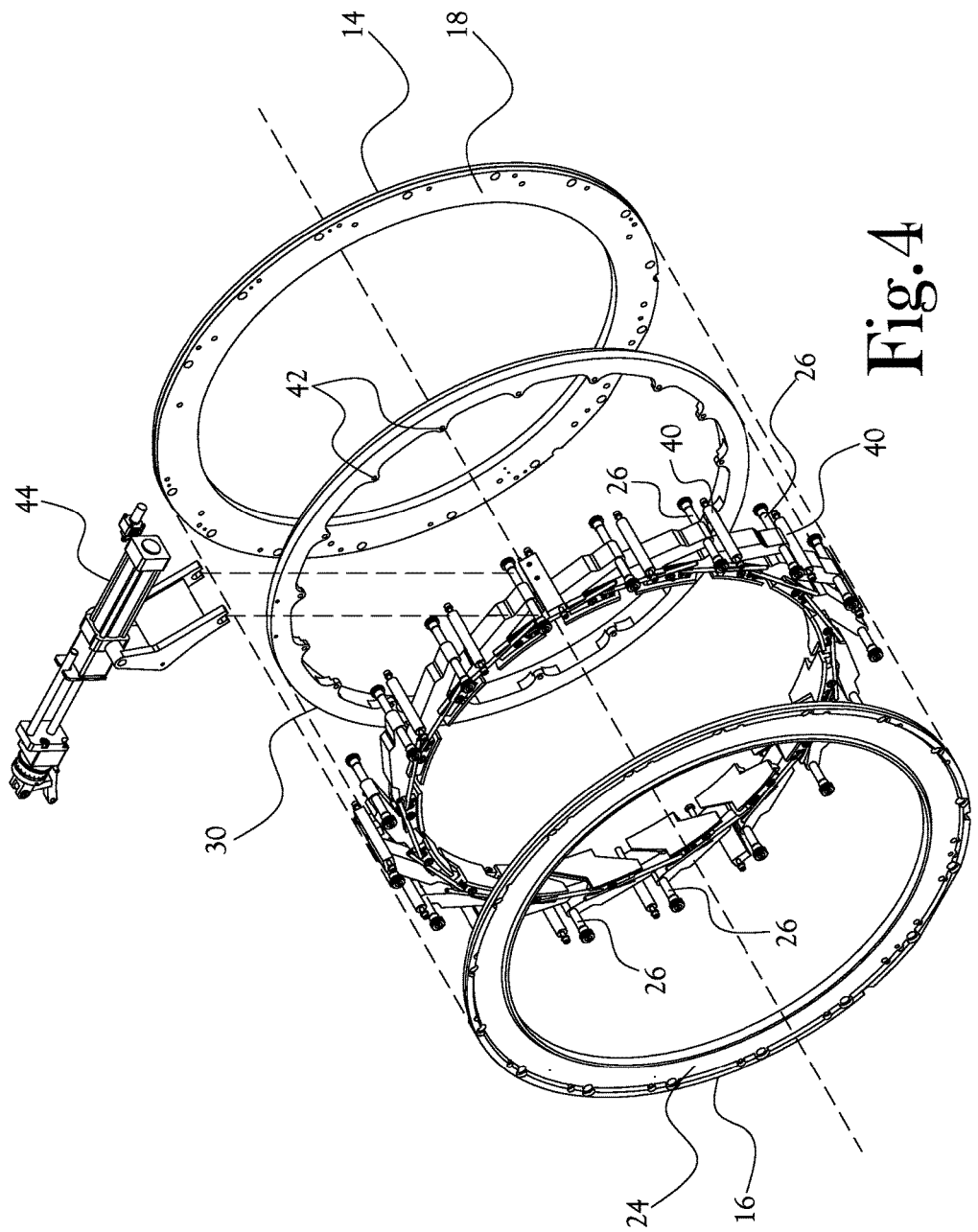
FIG. 4 is an exploded view of the transfer ring of FIG. 1.
Figure 5:
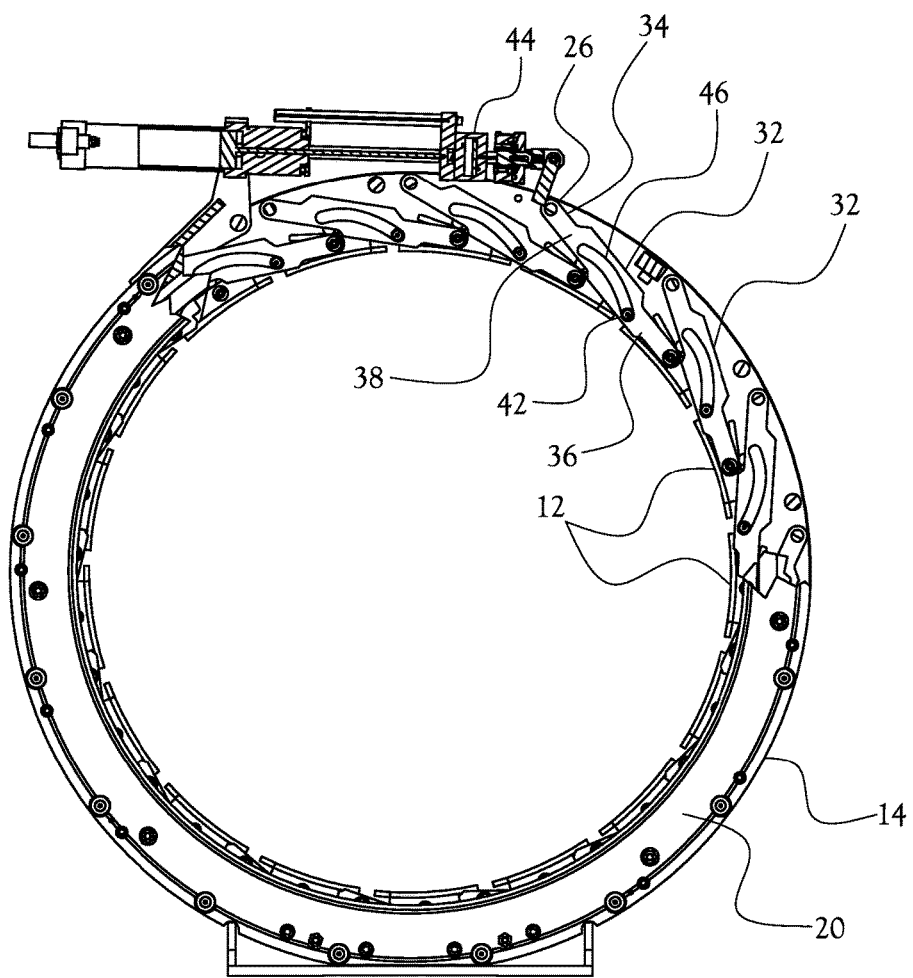
FIG. 5 is a partial-cutaway side view of the transfer ring of FIG. 1.

Within the open space 28 of the skeletal cage 25, there is disposed a circular drive member 30 mounted in side-by-side, parallel, and coaxial relationship to the first and second circular frame members 14, 16, via a plurality of rollers 40 extending between the first and second circular frame members 14, 16, such that the drive member 30 is rotatable about a central axis of the drive member 30 with respect to the skeletal cage 25. Referring to FIGS. 1, 3, and 5, a plurality of driven links 32 are also provided within the open space 28 of the skeletal cage 25. Each driven link 32 is of an elongated geometry, having a first end 34 which is hingedly mounted on a respective hinge pin connector 26 extending between the first and second circular frame members 14, 16, and a second end 36 which extends generally inwardly of the skeletal cage 25. Each driven link 32 further defines a first side surface 38 extending parallel to the inner and outer opposite flat side surfaces 18, 20 and 22, 24 of the first and second circular frame members 14, 16. An elongated camming groove 46 is defined in each first side surface 38 of each driven link 32 and extends generally along the length of the driven link 32. Each camming groove 46 has, operatively received therein, one of a plurality of roller cam followers 42 which are disposed at locations about the drive member 30 and extend generally parallel to the central axis of the drive member 30, toward the driven links 32. A power source 44, such as the piston/cylinder device illustrated in FIG. 1, is provided for effecting controlled rotation of the drive member 30 in relation to the skeletal cage 25. Thus, actuation of the power source 44 results in rotational movement of the drive member 30 in relation to the skeletal cage 25, which in turn moves each cam follower 42 along its respective camming groove 46, thereby rotating each driven link 32 about its respective hinge pin connector 26 between a contracted position (see FIG. 1), in which each second end 36 of each driven link 32 extends generally radially inwardly toward a central axis of the drive member 30 and the first and second circular frame members 14, 16, and an expanded position (see FIG. 2), in which each second end 36 of each driven link 32 extends generally along a circumference of the drive member 30.

Figure 6:
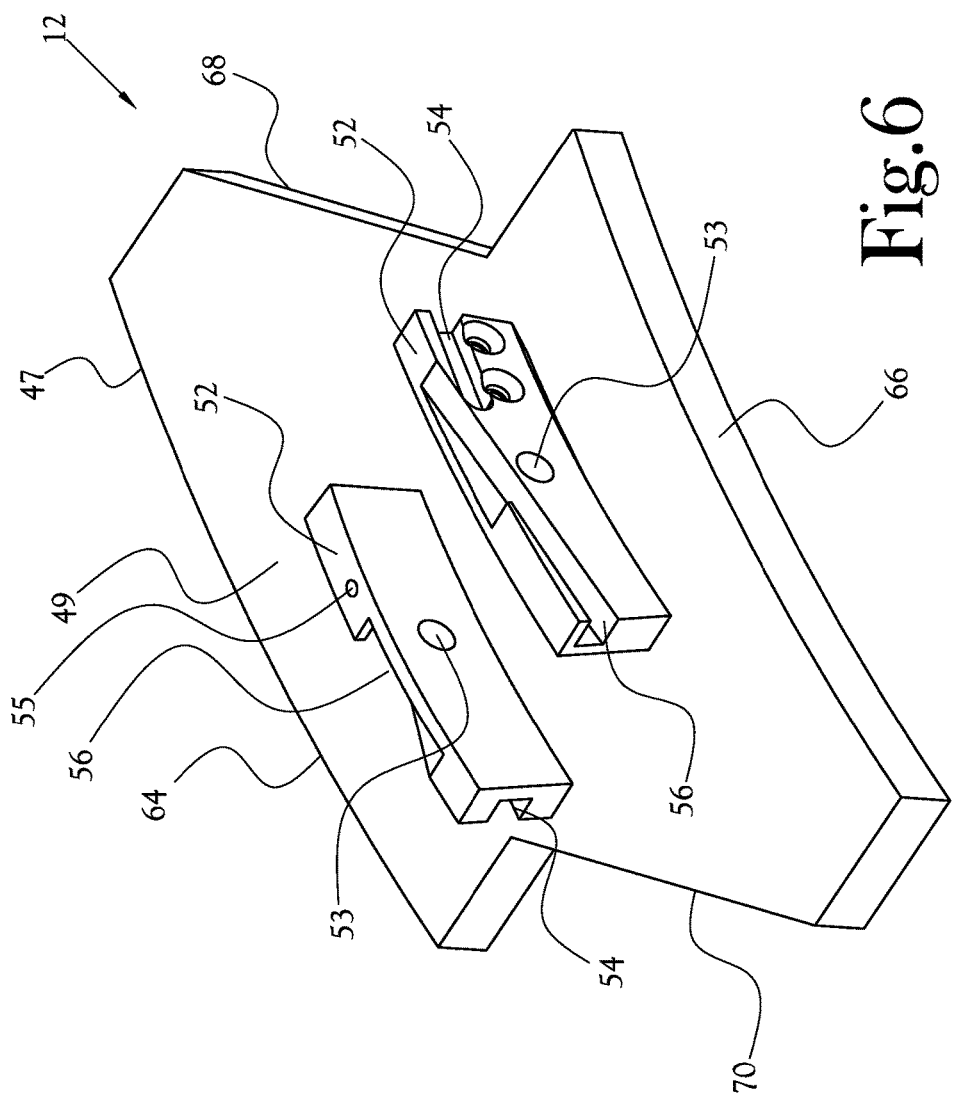
FIG. 6 is a perspective view of one embodiment of a shoe constructed in accordance with several features of the present general inventive concept.
Figure 7:
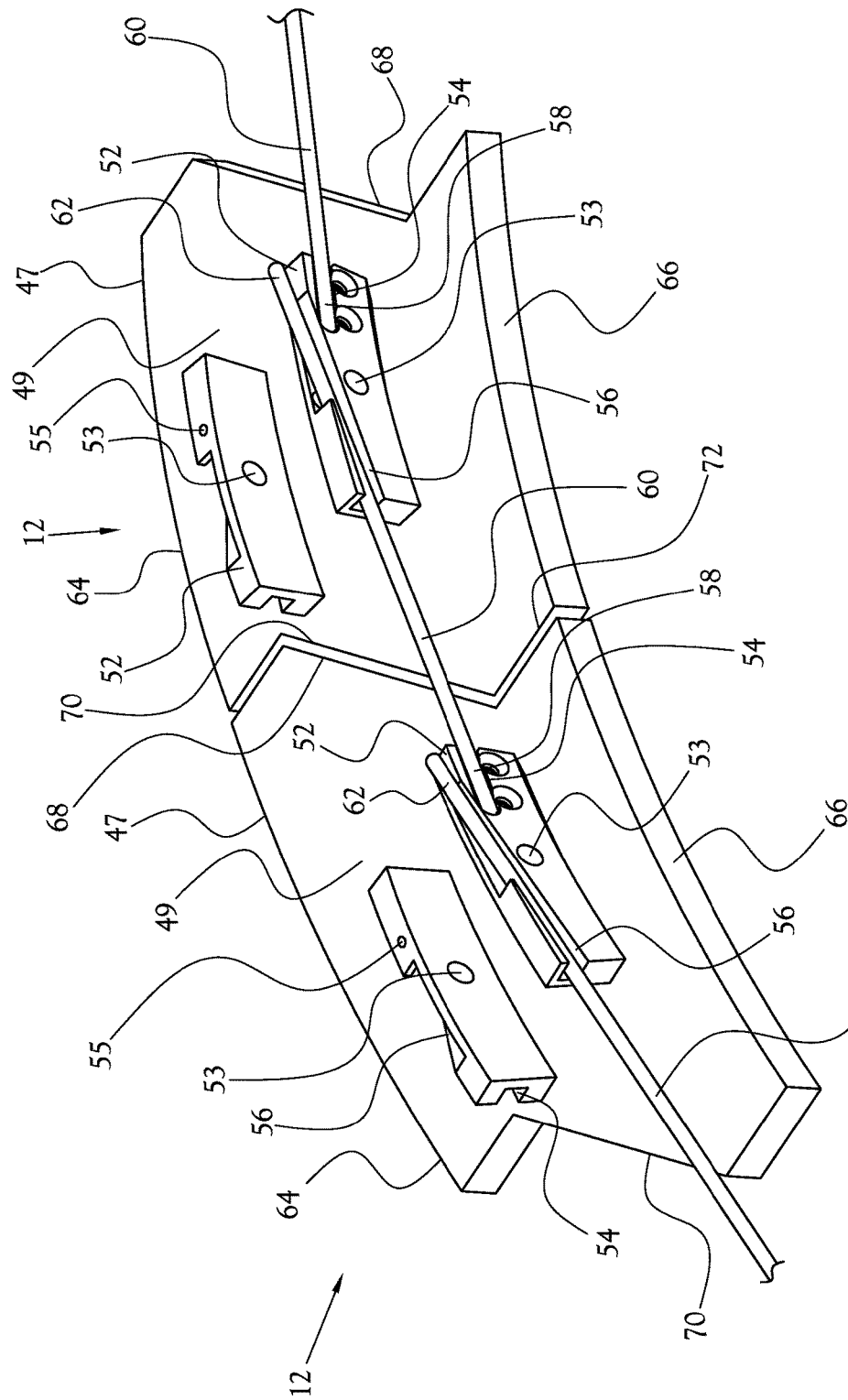
FIG. 7 is a perspective view showing a plurality of shoes constructed in accordance with several features of the present general inventive concept.
Figure 8:
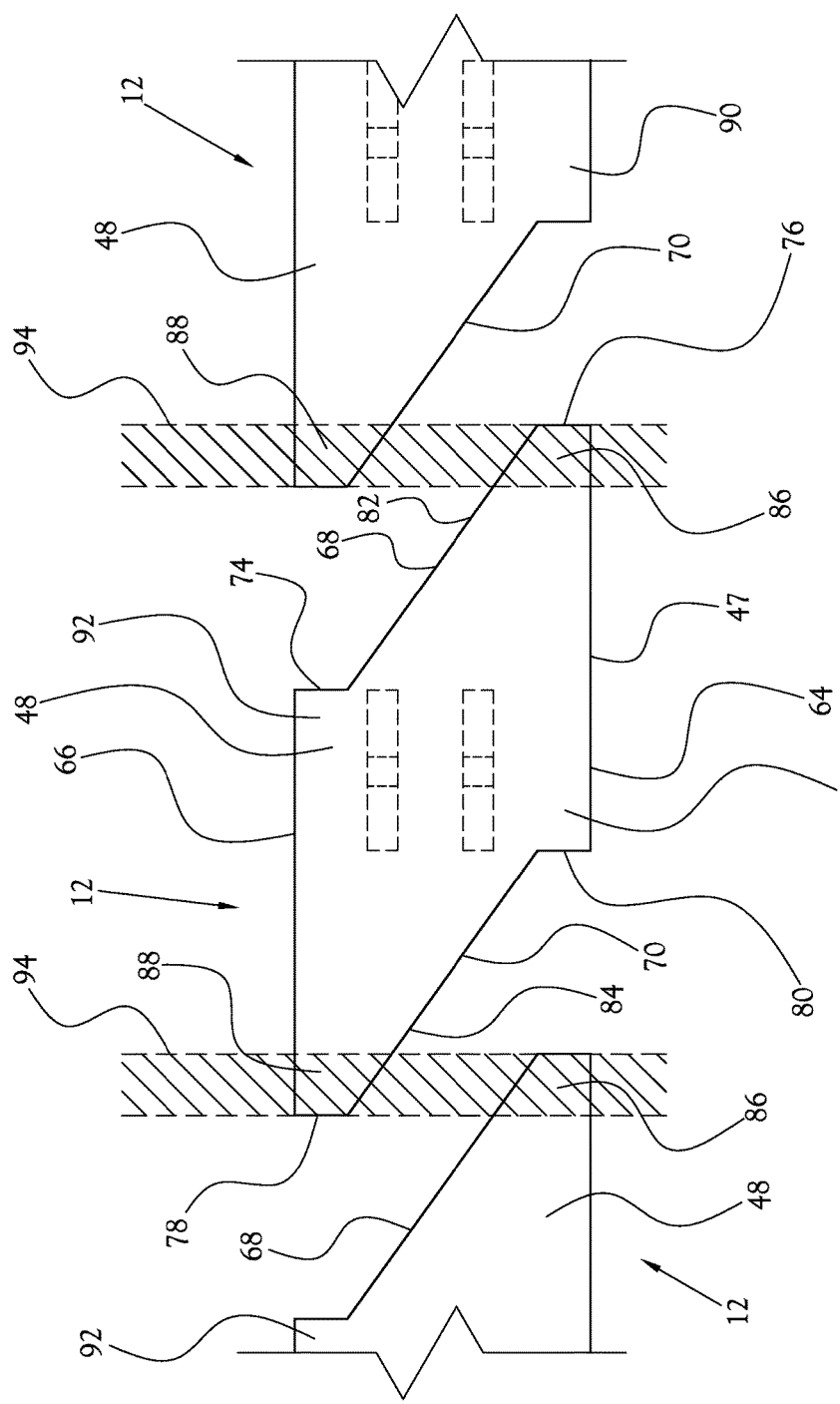
FIG. 8 is a plan view of one embodiment of a plurality of shoes constructed in accordance with several features of the present general inventive concept.

Referring to FIGS. 1-3 and 6-8, and as mentioned above, a plurality of articulating shoes 12 are provided, with one shoe 12 being hingedly attached to the second end 36 of each of the driven links 32 along a dimension parallel to the central axis of the skeletal cage 25. As is illustrated in FIGS. 6-8, each shoe 12 includes a plate 47 having an arcuate interior surface 48 facing substantially radially inwardly of the skeletal cage 25 and an outer surface 49 facing substantially radially outwardly of the skeletal cage 25. Each plate 47 defines first and second arcuate side edges 64, 66, respectively, as well as first and second end edges 68, 70, respectively, which extend at opposite ends of the arcuate plate 47 between the first and second side edges 64, 66. The various shoes 12 are arranged in an end-to-end configuration with each first end edge 68 of each plate 47 extending generally along a second end edge 70 of an adjacent plate 47, such that the various arcuate interior surfaces 48 of the plates 47 of the shoes 12 cooperate to collectively establish a segmented cylindrical surface 50 which, as will be further discussed below, is adapted to surround and grasp an object, such as for example a tire component.

FIG. 6 illustrates a perspective view of the outer surface 49 of one shoe 12 of the present embodiment. As shown in FIG. 6, each shoe 12 further includes at least one wall 52 extending outwardly from the plate 47 generally perpendicular to the outer surface 49. In the illustrated embodiment, a pair of walls 52 extend outwardly from the plate 47 at a parallel, spaced apart orientation to one another along an arcuate dimension of the plate 47. The walls 52 are spaced apart from one another a suitable distance to allow the second end 36 of one of the driven links 32 to be inserted therebetween. Suitable fastening means, such as for example a plurality of axially-aligned through openings 53, are provided along the walls 52 and through each driven link second end 36 to allow receipt therein of a pin, bolt, or other such rotatable connector, so as to allow each shoe 12 to be rotatably connected to a corresponding driven link second end 36. In the illustrated embodiment, an internally-threaded set screw opening 55 is provided opening perpendicular to an axial dimension of one of the through openings 53, such that upon receipt of a pin connector through the through openings 53 in the walls 52 and the driven link second end 36, a set screw (not shown) may be received within the set screw opening 55 to secure the pin connector through the through openings 53. However, it will be understood that other suitable configurations exist which may be used to achieve a rotatable connection between each shoe 12 and a corresponding driven link second end 36, and such other configurations may be used without departing from the spirit and scope of the present general inventive concept.

Referring to FIGS. 6 and 7, first and second grooves 54, 56 are defined along each wall 52 of each shoe 12, with each first groove 54 having at least one open end which opens toward an adjacent shoe, and with each second groove 56 having at least one open end which opens toward an opposite adjacent shoe. The first groove 54 is adapted to receive therein a first end 58 of a rigid guide rod 60 of sufficient length to span two adjacent ones of the shoes 12. The first end 58 of each guide rod 60 is anchored within its respective first groove 54 by a suitable fastener, such as for example a screw, bolt, weld, adhesive, or other fastener, or by an integral connection. An opposite second end 62 of each guide rod 60 extends into and is slidably received within the second groove 56 of an adjacent shoe.

Referring again to FIGS. 1-3, as discussed above, the second ends 36 of the driven links 32 are configured to rotate between the expanded position and the collapsed position upon appropriate rotation of the drive member 30 in relation to the skeletal cage 25. Thus, upon rotation of the second ends 36 of the driven links 32 to the expanded position, the shoes 12 are carried by the second ends 36 of the driven links 32 to an expanded configuration, wherein the interior surfaces 48 of the shoes are separated from one another to increase the overall diameter of the segmented cylindrical surface 50. Conversely, upon rotation of the second ends 36 of the driven links 32 to the contracted position, the shoes 12 are carried by the second ends 36 of the driven links 32 to a contracted configuration, wherein the interior surfaces 48 of the shoes are brought closer to one another to decrease the overall diameter of the segmented cylindrical surface 50. To this end, and with reference again to FIGS. 6 and 7, each of the first and second grooves 54, 56 is oriented with respect to one another such that each of the guide rods 60 slide along its respective second groove 56 to cooperatively maintain the interior surfaces 48 of the shoes 12 with respect to one another in a generally cylindrical configuration throughout the above-discussed expansion and contraction of the shoes 12 between the expanded configuration and the collapsed configuration.

As discussed above, each first end edge 68 of each plate 47 extends generally along a second end edge 70 of an adjacent plate 47, such that the interior surfaces 48 of the plates 47 cooperate to collectively establish a segmented cylindrical working surface 50. In this manner, each pair of adjacent shoes 12 cooperate to define a "gap" or "seam" 72 along adjacent first and second end edges 68, 70 of the adjacent shoes 12. In accordance with various features of the present general inventive concept, in several embodiments, at least one end edge 68, 70 of at least one plate 47 defines a profile shape along a length thereof which is non-linear, irregular, and/or varied, such that the seam 72 formed along the irregularly-shaped end edge extends along an irregular path which is, at least in part, non-parallel to an axial dimension of the segmented cylindrical surface 50. For example, in several embodiments, the various end edges 68, 70 of the arcuate plates 47 of the shoes 12 each define a non-linear, irregular, and/or varied shape, such that when the shoes 12 are positioned adjacent one another in the contracted position to form the segmented cylindrical surface 50, each seam 72 formed between adjacent shoes 12 extends along an irregular path which is, at least in part, non-parallel to an axial dimension of the segmented cylindrical surface 50. With reference to FIGS. 6-8, in various embodiments, the various end edges 68, 70 of the arcuate plates 47 of the shoes 12 each extend, at least in part, in a direction non-parallel to an axial dimension of the segmented cylindrical surface 50. As will be further discussed below, such configuration of the seams 72 between adjacent shoes in an orientation at least partially non-parallel to the axial dimension of the segmented cylindrical surface 50 assists in limiting the formation of resonance or vibration of a finished tire manufactured using the transfer ring 10.

In several embodiments, the end edges 68, 70 of the arcuate plates 47 are shaped such that the plates 47 define a plurality of alternating protrusions 86, 88 and recesses 90, 92 extending along the circumference of the segmented circumferential surface 50. For example, in the embodiment of FIG. 8, each of the first and second end edges 68, 70 of each plate 47 defines first and second exterior portions 74, 76, 78, 80 which extend at a generally right angles to corresponding adjacent first and second side edge 64, 66 of the shoe 12. Central portions 82, 84 of each of the first and second end edges 68, 70 of each shoe 12 extend generally at an oblique angle to an axial dimension of the segmented cylindrical surface 50 between corresponding first and second exterior portions 74, 76, 78, 80. More specifically, a first central portion 82 of the first end edge 68 extends between corresponding first and second exterior portions 74, 76 of the first end edge 68 at an oblique angle to an axial dimension of the segmented cylindrical surface 50. Likewise, a second central portion 84 of the second end edge 70 extends between corresponding first and second exterior portions 78, 80 of the second end edge 70 at a substantially similar oblique angle, generally parallel to the first central portion 82. Thus, each arcuate plate 47, at an intersection of the first end edge 68 with the first side edge 64 thereof, defines a first protrusion 86 which extends along the circumference of the segmented cylindrical surface 50. A second protrusion 88 is defined at an intersection of the second end edge 70 with the second side edge 66, and extends along the circumference of the segmented circumferential surface 50 in a direction opposite to the first protrusion 86. A first recess 90 is defined at an intersection of the first side edge 64 with the second end edge 70, and a second recess 92 is defined at an intersection of the second side edge 66 with the first end edge 68.

As discussed above, the various interior surfaces 48 of the shoes 12 in the transfer ring 10 are adapted to fit together in a mating relationship along respective adjacent end edges 68, 70 when the transfer ring 10 is in the contracted position (FIG. 1) to form the segmented cylindrical surface 50. Accordingly, in the present embodiment, the first protrusion 86 of each shoe 12 is keyed to mating engagement with the first recess 90 of an adjacent shoe 12, and the second recess 92 of each shoe 12 is keyed to mating engagement with the second protrusion 88 of the adjacent shoe 12. In the illustrated embodiment, each of the central portions 82, 84 of the first and second end edges 68, 70 extends along substantially the same oblique angle to the central axis of the segmented cylindrical surface 50, and thus, each first central portion 82 is keyed to the second central portion 84 of an adjacent shoe 12, and vice versa.

FIG. 8 illustrates a plan view showing multiple shoes 12 arranged in an end-to-end configuration, with the shoes 12 being spaced apart from one another to resemble the expanded position of the transfer ring 10. As can be seen in FIG. 8, in several embodiments, when the various shoes 12 are arranged in the expanded position, the first protrusion 86 of each shoe 12 extends sufficiently along the circumference of the expanded segmented cylindrical surface 50 as to overlap the second protrusion 88 of the adjacent shoe 12 along a zone 94 parallel to the axial dimension of the cylindrical surface 50. Thus, in the event a tire component is held within the cylindrical surface 50 in the expanded position of the transfer ring 10, at least one shoe 12 may overlie the tire component about the entire circumference of the tire component.

Figure 9:
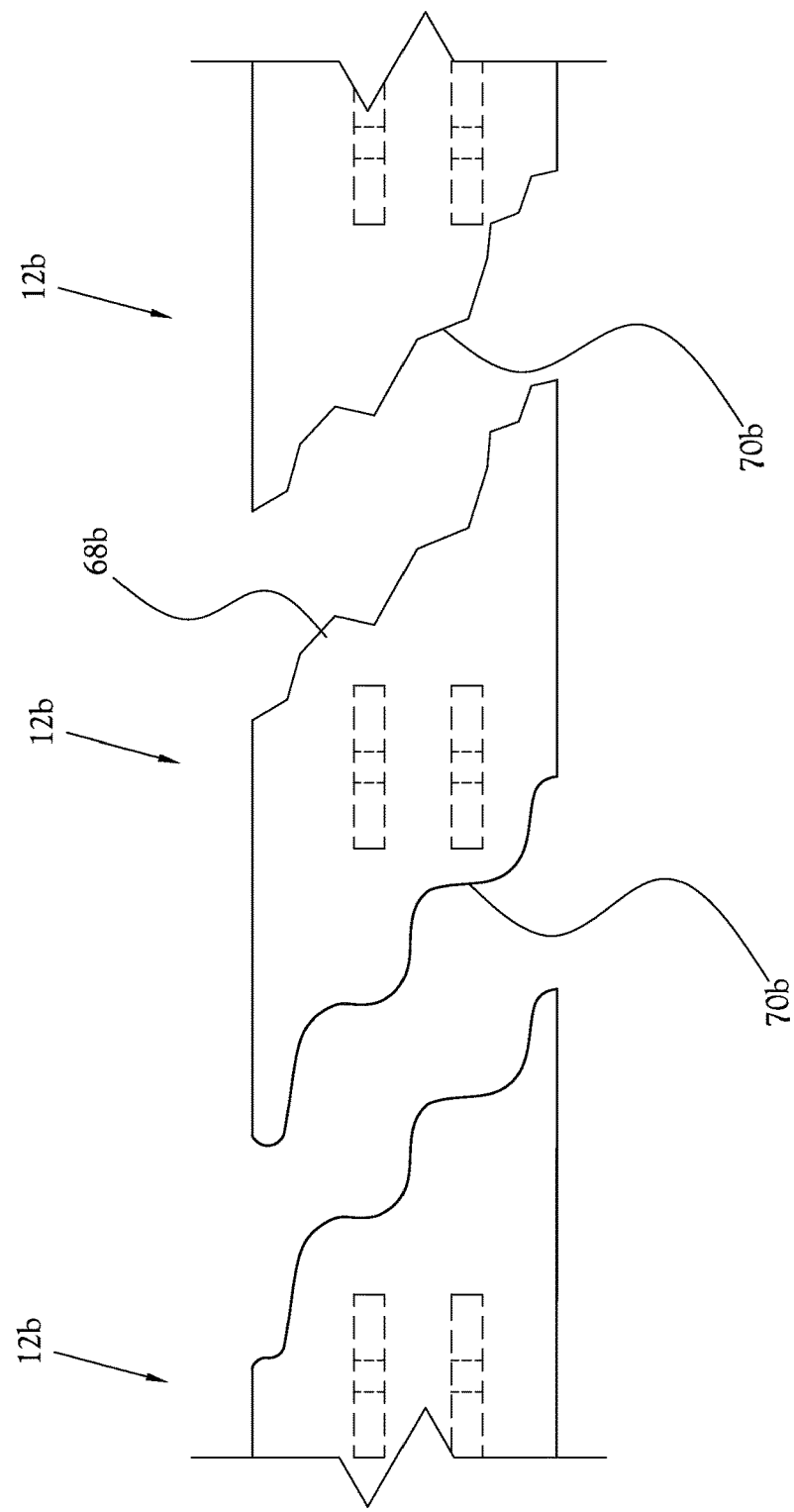
FIG. 9 is a plan view of another embodiment of a plurality of shoes constructed in accordance with several features of the present general inventive concept.

In the illustrated embodiment, the profiles of the first and second end edges 68, 70 of each of the plates 47 are depicted as being symmetrical to one another about a central point of the plate 47. However, it will be understood that such symmetry is not necessary to accomplish the present general inventive concept. Furthermore, it will be understood that, in various embodiments, one or more of the shapes defined by the various end edges 68, 70 of the various shoes 12 of the transfer ring 10 may differ from one or more other of the various end edges 68, 70, such that the shapes defined by one or more of the seams 72 between adjacent shoes 12 differs from the shapes defined by one or more of the other seams 72 about the transfer ring 10. In preferred embodiments, each first end edge 68 of each shoe 12 is shaped to generally matingly engage with an adjacent second end edge 70 of an adjacent shoe 12, such that the width of each of the seams 72 between adjacent shoes 12 is essentially minimized when the segmented cylindrical surface 50 of the transfer ring 10 is in the collapsed position. For example, FIG. 9 illustrates a plurality of shoes 12b constructed in accordance with several features of the present general inventive concept. In the embodiment of FIG. 9, each first end edge 68b of each shoe 12b about the cylindrical surface 50b defines a unique shape which differs from the shapes of the first end edges of the remaining shoes 12b, such as for example a sinusoidal shape, a wave shape, a puzzle shape, a zigzag or jagged shape, a combination thereof, of the like. Each second end edge 70b of each shoe 12b is shaped to conform to the shape of the first end edge 68b of an adjacent shoe 12b for mating engagement with the adjacent shoe.

Figure 10:
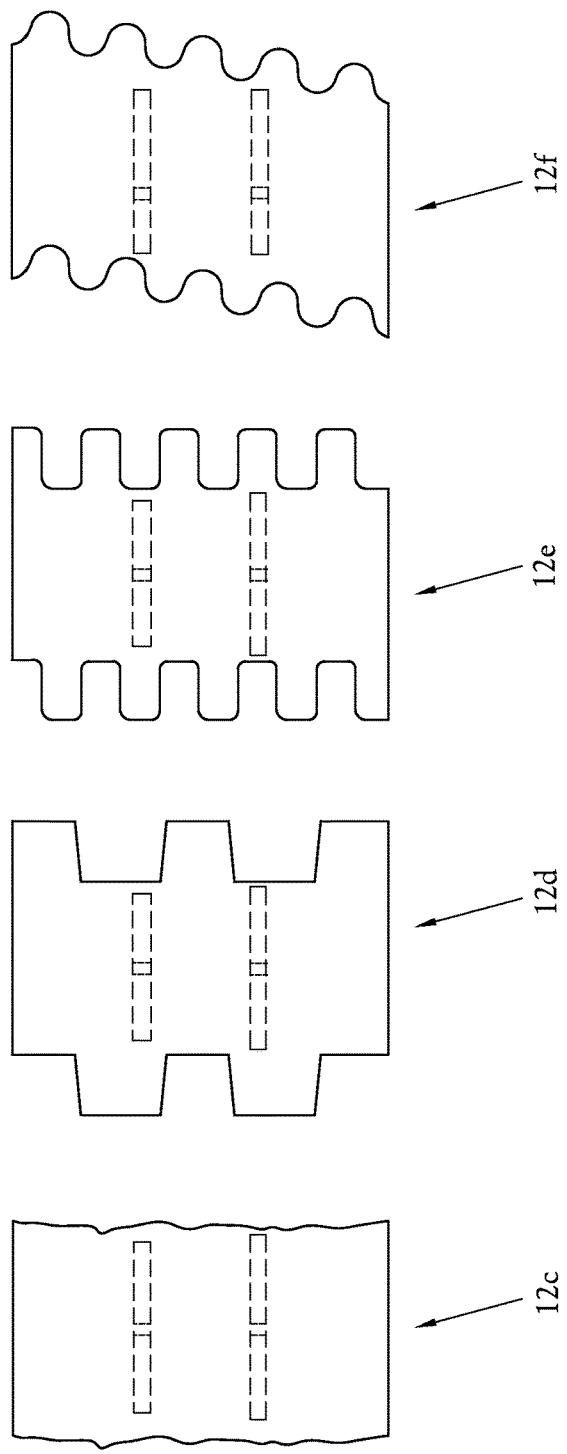
FIG. 10 is a plan view showing several additional embodiments of shoes constructed in accordance with several features of the present general inventive concept.

FIG. 10 illustrates several additional possible shapes suitable for use in forming the interior surfaces 48 of the shoes 12. As shown in FIG. 10, in one embodiment, each shoe 12c includes first and second end edges which define irregular, jagged profiles. In other embodiments, such as the embodiments depicted at 12d-f, each shoe includes first and second end edges which define a series of regularly-spaced protrusions with matching recesses defined therebetween.

Figure 11:
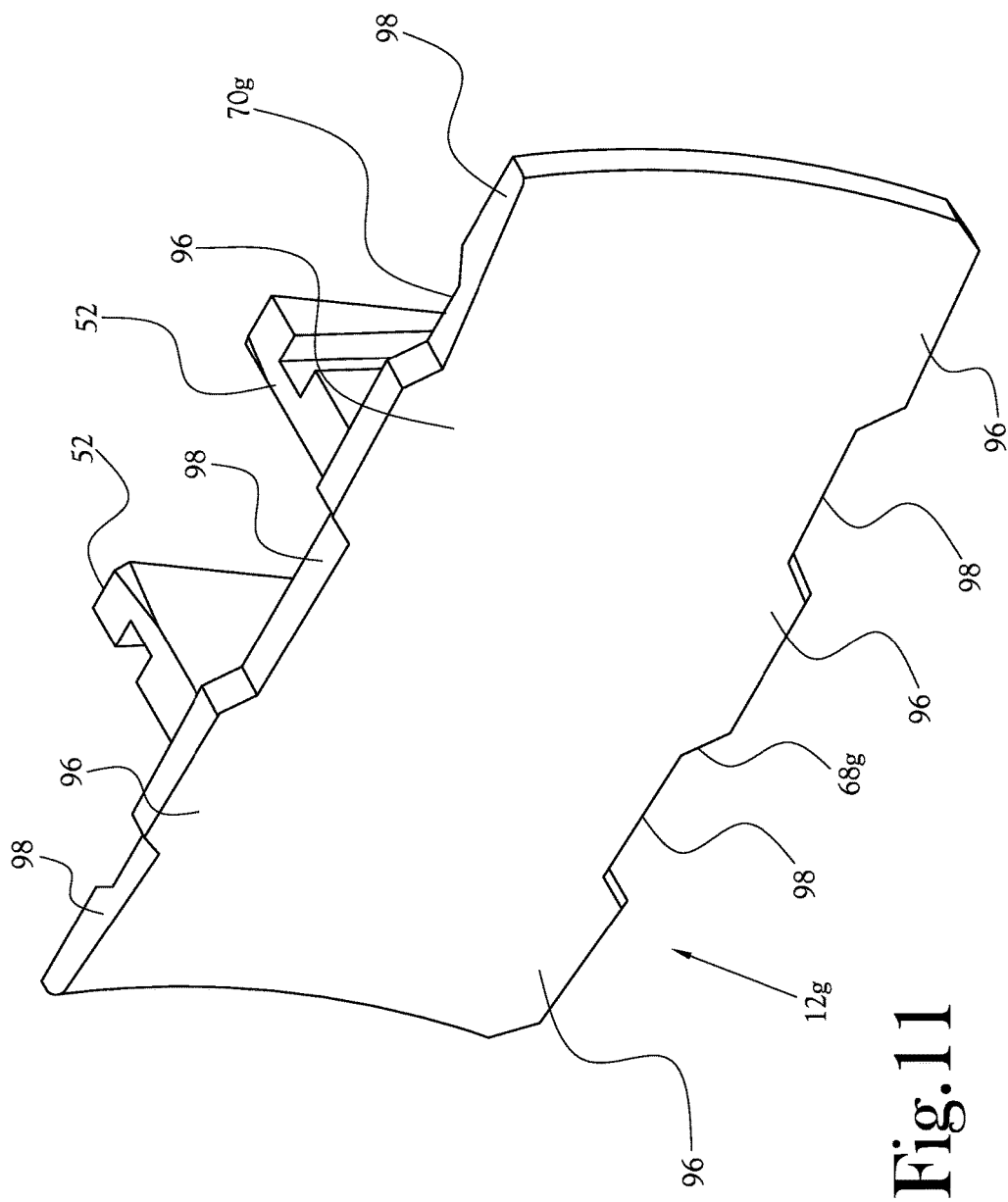
FIG. 11 is a perspective view of another embodiment of a shoe constructed in accordance with several features of the present general inventive concept.

FIG. 11 illustrates another embodiment of a shoe 12g constructed in accordance with several features of the present general inventive concept. In the embodiment of FIG. 11, a first end edge 68g of each shoe 12g defines a series of trapezoidal-shaped protrusions 96, with similarly-shaped trapezoidal recesses 98 defined therebetween. As in the previous embodiments described above, each second end edge 70g of each shoe 12g defines similar protrusions 96 and recesses 98 positioned along the second end edge 70g such that the second end edge 70g is shaped to conform to the shape of the first end edge 68g of an adjacent shoe 12g for mating engagement with the adjacent shoe.

Figure 12:
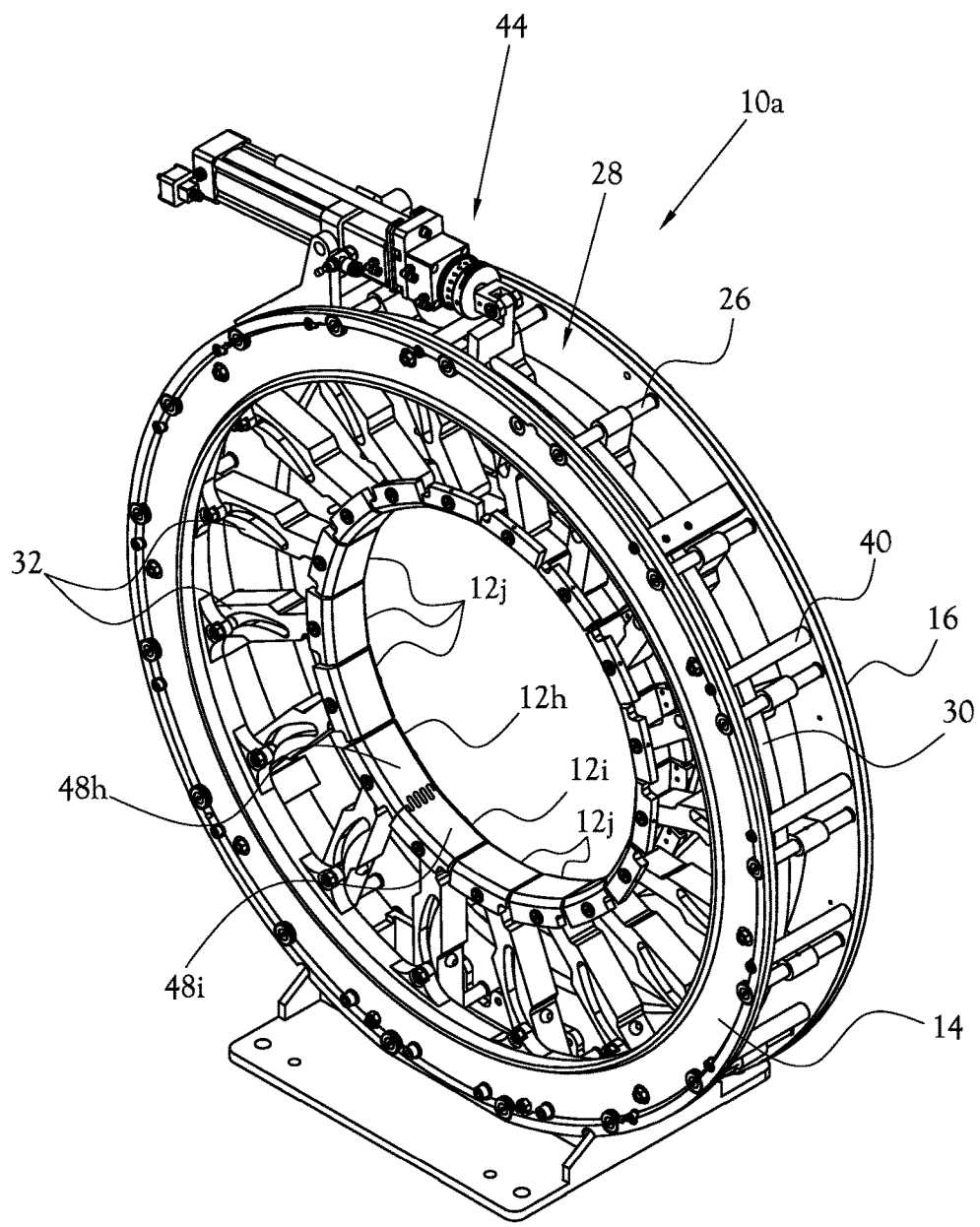
FIG. 12 is a perspective view of another embodiment of a transfer ring constructed in accordance with several features of the present general inventive concept.
Figure 13:
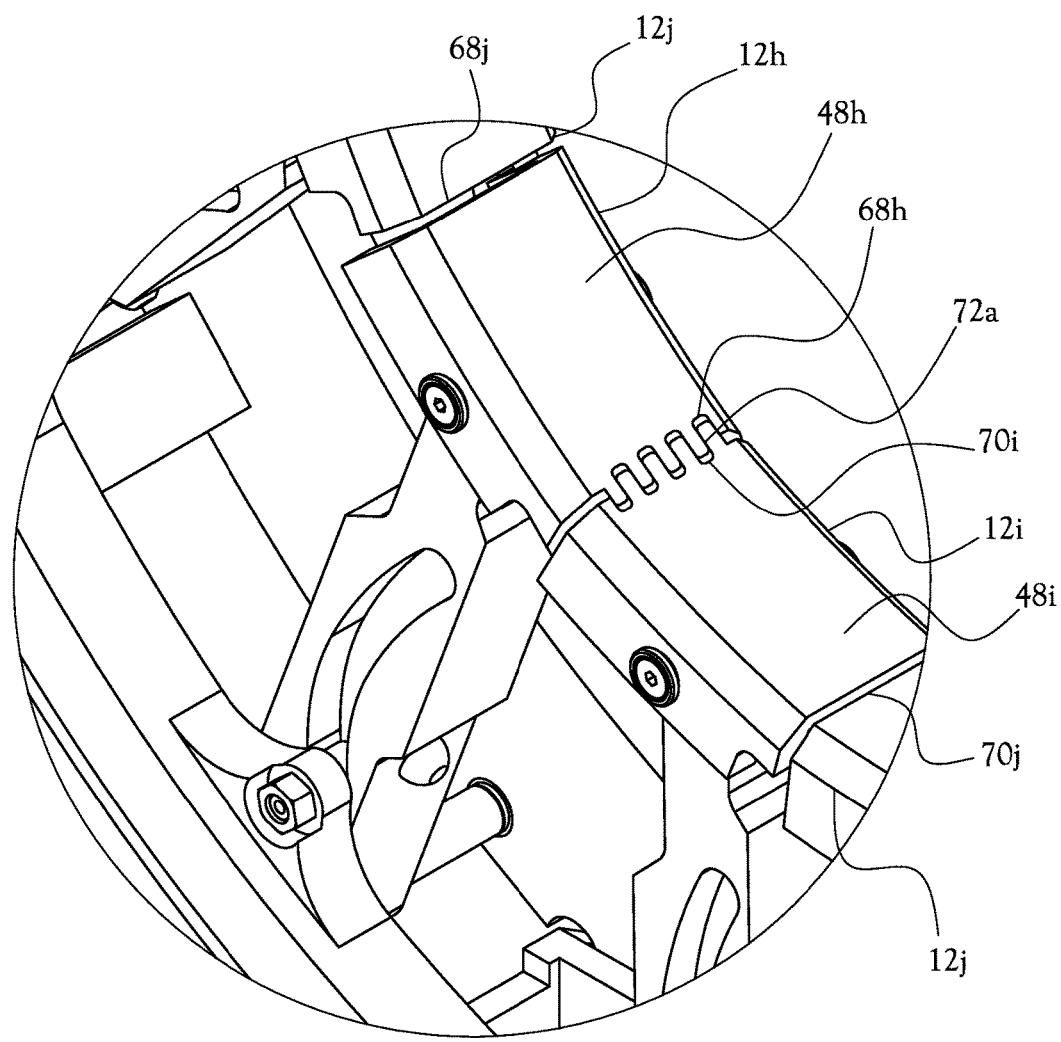
FIG. 13 is a partial perspective view showing a portion of the transfer ring of FIG. 12.

FIGS. 12 and 13 illustrate another embodiment of a transfer ring 10a constructed in accordance with several features of the present general inventive concept. In the embodiment of FIGS. 12 and 13, first and second adjacent shoes 12h, 12i are provided having respective interior surfaces 48h, 48i. Similarly to that described above, the interior surface 48h of the first shoe 12h has a first end edge 68h which is disposed adjacent a corresponding second end edge 70i of the interior surface 48i of the second shoe 12i. In the illustrated embodiment, the first end edge 68h of the interior surface 48h of the first shoe 12h defines a first profile shape along the interior surface 48h, and the second end edge 70i of the interior surface 48i of the second shoe 121 has a corresponding profile shape along the interior surface 48i which is keyed to mating engagement with the shape of the first end edge 68h of the interior surface 48h of the first shoe 12h. Thus, when the transfer ring 10a is in the collapsed position, the seam 72a formed between the mated first and second end edges 68h, 70i conforms generally to the first profile shape.

In the illustrated embodiment, the remaining end edges 68j, 70j of the various shoes 12j about the transfer ring 10b each conform to a second profile shape. Thus, in the collapsed position of the transfer ring 10b, the seams 72b defined by the remaining adjacent end edges 68j, 70j, of the various shoes 12j also conform generally to the second profile shape. In the illustrated embodiment, the first profile shape defined by the adjacent first and second end edges 68h, 70i is an irregular shape, and more specifically, a shape comprising alternating protrusions and recesses of the type described above. However, the second profile shape, defined by the remaining end edges 68j, 70j of the various shoes 12j about the transfer ring 10b, is a substantially straight line extending substantially parallel to an axial dimension of the segmented cylindrical working surface 50. Thus, in the illustrated embodiment, only one of the pairs of adjacent end edges 68h, 70i of the various shoes about the transfer ring 10b defines a varied shoe profile.

It will be appreciated by one of skill in the art that a transfer ring constructed in accordance with features of the present general inventive concept may incorporate shoes defining any number of varied shoe profiles, in addition to one or more non-varied shoe profiles. For example, in various embodiments, one or more end edges of one or more shoes may conform to a first profile, while other end edges may conform to a second profile, a third profile, and so on. However, pursuant to the present general inventive concept, at least one end edge of at least one shoe defines a profile shape along the arcuate surface thereof which is non-linear, irregular, and/or varied as described above.

It will be recognized that, in the use of a transfer ring 10 to grasp and transport tire components, in which the transfer ring 10 employs shoes 12 having one or more varied profiles along the various end edges 68, 70 thereof as described above, in the event such shoes 12 are made to grasp a tire component with sufficient force to produce imprints of the shoes and/or bulges between the shoes in the tire component, the general shape and orientation of the bulges along the tire component will generally follow the varied profiles of the first and second end edges 68, 70 of the shoes 12. Accordingly, by imprinting bulges along the tire component having varied profiles and/or orientation, regular spacing and/or orientation of bulges along the tire component is disrupted, thereby reducing the likelihood that harmonic resonance and/or other vibration will occur in a finished tire comprising the tire component.

While the present invention has been illustrated by description of several embodiments and while the illustrative embodiments have been described in detail, it is not the intention of the applicant to restrict or in any way limit the scope of the appended claims to such detail. Additional modifications will readily appear to those skilled in the art. The invention in its broader aspects is therefore not limited to the specific details, representative apparatus and methods, and illustrative examples shown and described. Accordingly, departures may be made from such details without departing from the spirit or scope of applicant's general inventive concept.

Having thus described the aforementioned invention, what is claimed is:

1. A transfer ring comprising:
   a circular frame;
   a plurality of elongated driven links, each driven link having a first end rotatably mounted along the circular frame such that each driven link is rotatable between a contracted position and an expanded position;
   a drive member disposed along the circular frame, the drive member being in operable engagement with the driven links and configured to drive the driven links between the contracted position and the expanded position; and
   a plurality of shoes having arcuate interior surfaces facing substantially radially inwardly toward a central axis to collectively define a substantially cylindrical segmented gripping surface, each shoe being rotatably mounted to a second end of a respective one of the driven links, each shoe arcuate interior surface having a first arcuate edge and an opposite second arcuate edge extending substantially parallel to one another along a circumferential dimension of the cylindrical segmented gripping surface and opposite first and second end edges extending between respective ends of the first and second arcuate edges;
   wherein the first end edge of the arcuate interior surface of each shoe is mounted adjacent the second end edge of the arcuate interior surface of a respective adjacent one of the shoes, and wherein the first end edge of the arcuate interior surface of a first one of the shoes defines a first profile shape, in the form of a plurality of alternating protrusions and recesses along the circumferential dimension, which is keyed to mating engagement with a shape of the second end edge of the arcuate interior surface of a second one of the shoes adjacent to the first one of the shoes, the remaining first and second end edges conforming to a second profile shape which is a substantially straight line extending substantially parallel to an axial dimension of the cylindrical segmented gripping surface.

2. The transfer ring of claim 1, wherein each first end edge of each arcuate interior surface of each shoe is shaped to mate with the adjacent second end edge of the arcuate interior surface of the adjacent shoe.

* * * * *